United States Patent
Oeij (10) Patent No.: US 7,908,658 B1
(45) Date of Patent: Mar. 15, 2011

(54) SYSTEM USING IM SCREENER IN A CLIENT COMPUTER TO MONITOR BAD REPUTATION WEB SITES IN OUTGOING MESSAGES TO PREVENT PROPAGATION OF IM ATTACKS

(75) Inventor: Christianto Oeij, Yonghe (TW)

(73) Assignee: Trend Micro Incorporated, Tokyo (JP)

( * ) Notice: Subject to any disclaimer, the term of this patent is extended or adjusted under 35 U.S.C. 154(b) by 460 days.

(21) Appl. No.: 12/077,387

(22) Filed: Mar. 17, 2008

(51) Int. Cl.
*G06F 21/00* (2006.01)

(52) U.S. Cl. ............. 726/24; 726/22; 726/23; 709/206; 709/207

(58) Field of Classification Search .................. 709/223, 709/224, 225, 217, 218, 219, 229, 238, 203, 709/204, 206, 207; 715/764; 707/9; 706/13; 726/22, 23, 24
See application file for complete search history.

(56) References Cited

U.S. PATENT DOCUMENTS

| | | | |
|---|---|---|---|
| 2005/0050222 A1* | 3/2005 | Packer | 709/238 |
| 2005/0065935 A1* | 3/2005 | Chebolu et al. | 707/9 |
| 2005/0160144 A1 | 7/2005 | Bhatia | |
| 2006/0253584 A1* | 11/2006 | Dixon et al. | 709/225 |
| 2007/0006308 A1 | 1/2007 | Desouza et al. | |
| 2007/0043823 A1 | 2/2007 | George et al. | |
| 2007/0266079 A1* | 11/2007 | Criddle et al. | 709/203 |
| 2008/0063201 A1 | 3/2008 | Wormald et al. | |
| 2008/0082662 A1* | 4/2008 | Dandliker et al. | 709/225 |
| 2008/0084972 A1 | 4/2008 | Burke et al. | |
| 2008/0114709 A1* | 5/2008 | Dixon et al. | 706/13 |
| 2008/0307339 A1* | 12/2008 | Boro et al. | 715/764 |
| 2009/0182818 A1* | 7/2009 | Krywaniuk | 709/206 |

* cited by examiner

*Primary Examiner* — Le Luu
(74) *Attorney, Agent, or Firm* — Okamoto & Benedicto LLP (57) ABSTRACT

In one embodiment, an instant messaging screener is configured to (a) intercept an instant message destined to a user account, (b) parse the instant message to identify any universal resource locators (URLs) in the instant message, (c) check any URLs identified in the instant message against a URL ratings database to generate reputation data; and (d) perform a protective action if the reputation data indicates a bad reputation. In another embodiment, the instant messaging screener is configured to (a) monitor outgoing instant messages to identify any universal resource locators (URLs) therein which are associated with bad reputation web sites, (b) track historical results of said monitoring, and (c) determining whether said identified instant are being sent to all members, or a substantial portion of the members, of a contact list for a user account. Other embodiments, aspects and features are also disclosed.

7 Claims, 6 Drawing Sheets

SYSTEM USING IM SCREENER IN A CLIENT COMPUTER TO MONITOR BAD REPUTATION WEB SITES IN OUTGOING MESSAGES TO PREVENT PROPAGATION OF IM ATTACKS

BACKGROUND OF THE INVENTION

1. Field of the Invention

The present invention relates generally to computer systems and more particularly, but not exclusively, to methods and apparatus for providing a computer security service.

2. Description of the Background Art

Computer viruses, worms, Trojans, and spyware are examples of malicious code. Malicious code may, for example, corrupt or delete important files, send e-mails without user authorization, render a computer inoperable, or cause other types of damage to a computer. Malicious code may be communicated between computers, for example, by transferring files that include the code.

Web threats encompass a broad array of threats that originate from web sites on the Internet. For example, a web site may a "phish" site. A "phish" site is a fraudulent site that attempts to trick a user into providing sensitive information, such as credit card information, or user names and passwords. As another example, a web site may be a source of malicious code.

SUMMARY

One embodiment relates to an apparatus configured to protect users from instant messenger attacks. A processor is configured to execute computer-readable instructions, and a memory is configured to store said computer-readable instructions and other computer-readable data. In addition, an input/output interface is configured for communicating data to devices outside the apparatus, and a system communicatively interconnects the processor, the memory and the input/output interface. An instant messaging application is included, the instant messaging application comprising computer-readable instructions for receiving and sending instant messages. Furthermore, an instant messaging screener is included. The instant messaging screener is configured to (a) intercept an instant message destined to a user account, (b) parse the instant message to identify any universal resource locators (URLs) in the instant message, (c) check any URLs identified in the instant message against a URL ratings database to generate reputation data; and (d) perform a protective action if the reputation data indicates a bad reputation.

In another embodiment, the instant messaging screener is configured to (a) monitor outgoing instant messages to identify any universal resource locators (URLs) therein which are associated with bad reputation web sites, (b) track historical results of said monitoring, and (c) determining whether said identified instant are being sent to all members, or a substantial portion of the members, of a contact list for a user account.

Another embodiment relates to a method to protect against instant messenger attacks. An instant message is intercepted. The instant message is parsed to identify any universal resource locators (URLs) in the instant message. Any URLs identified in the instant message are checked against a URL ratings database to generate reputation data. A protective action is performed if the reputation data indicates a bad reputation.

Another embodiment relates to a method for protecting against propagation of instant messenger attacks. Outgoing instant messages are monitored to identify any universal resource locators (URLs) therein which are associated with bad reputation web sites. Historical results of said monitoring are tracked. A determination is made as to whether said identified instant messages are being sent to all members, or a substantial portion of the members, of a contact list for a user account.

Other embodiments relate to computer-readable media configured to store computer-readable instructions to perform methods disclosed herein.

Other embodiments, aspects and features are also disclosed.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
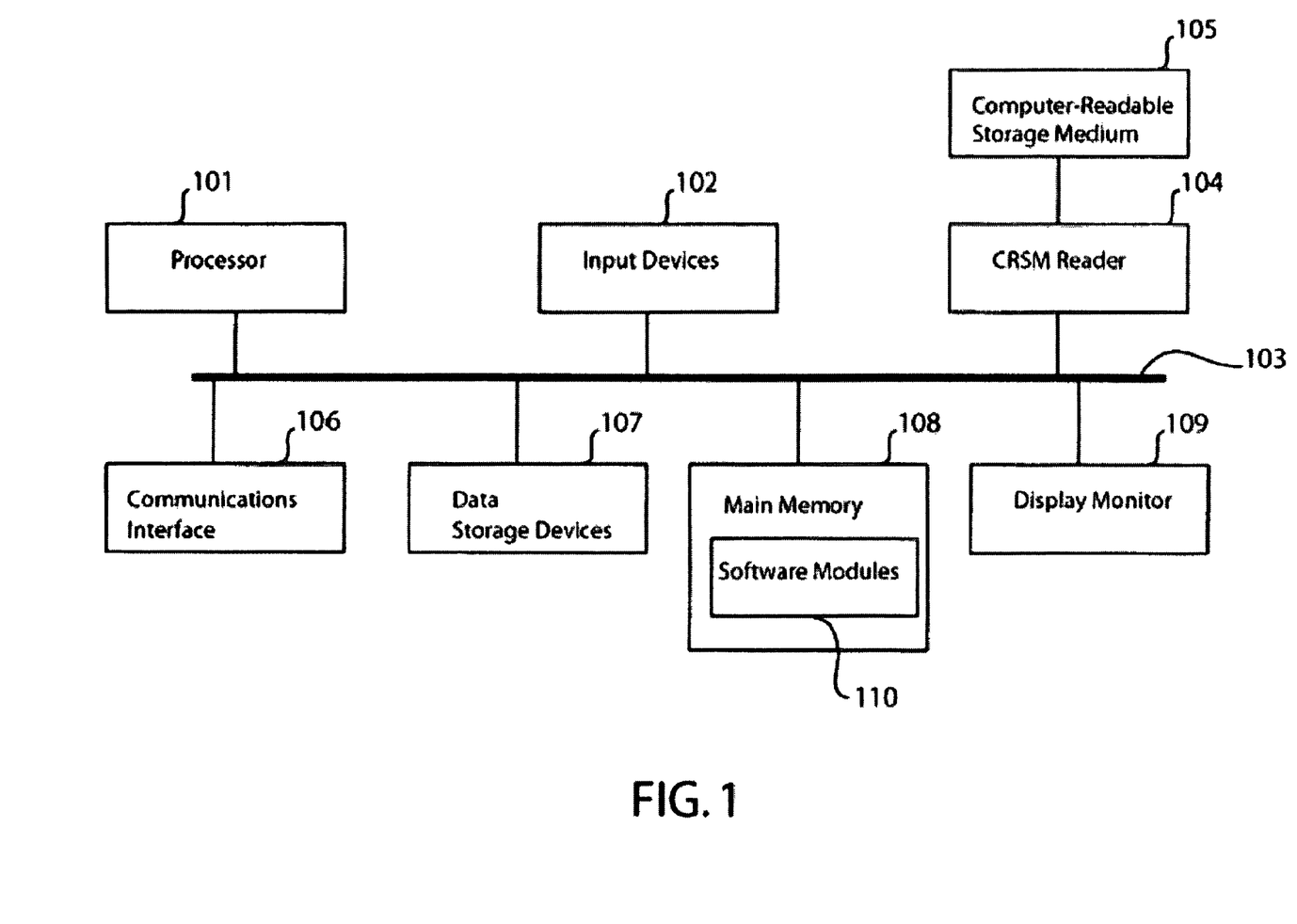
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a client computer or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. Software embodiments may also be received over a computer network by way of communications interface 106. In the example of FIG. 1, main memory 108 includes software modules 110, which may comprise software components of later described support server computers and customer client computers. The software modules 110 may be executed by processor 101.

Figure 2:
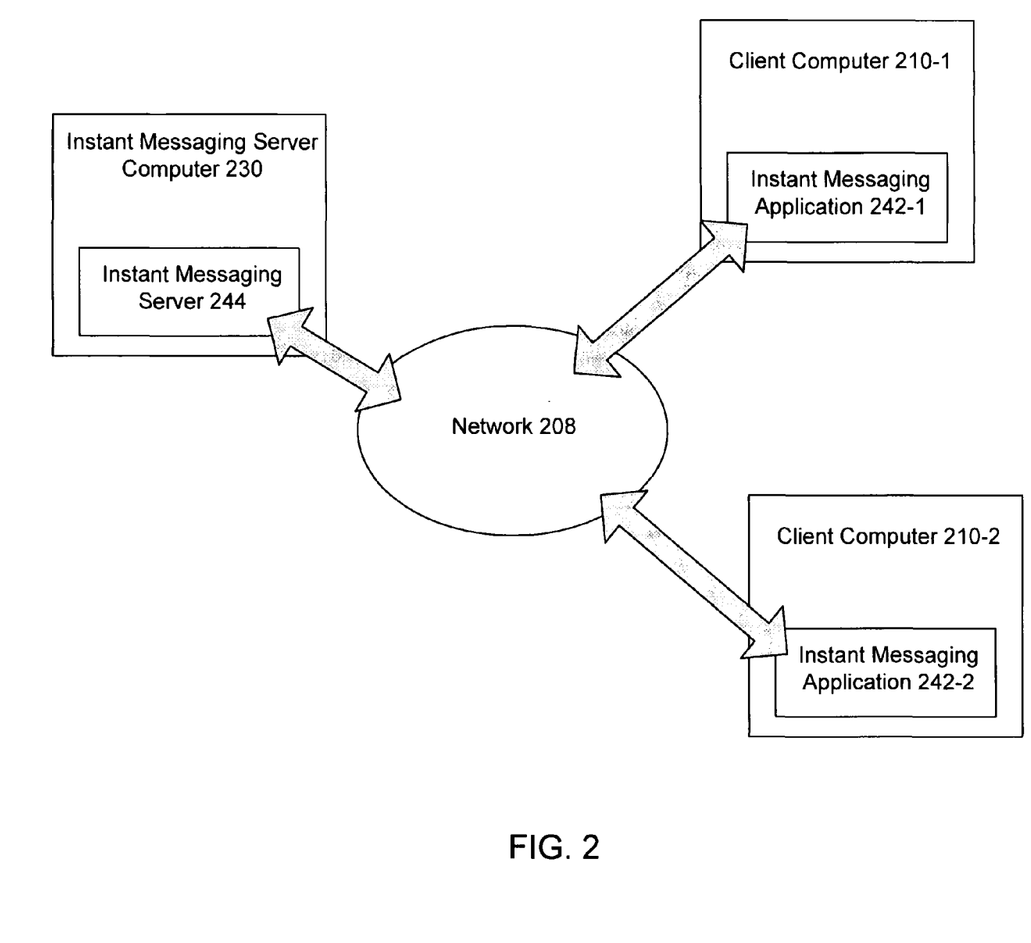
FIG. 2 schematically shows a conventional instant messaging system.

FIG. 2 schematically shows a conventional instant messaging system. Generally speaking, instant messaging is a form of electronic communication that involves immediate correspondence between two or more users who are all online simultaneously.

The conventional instant messaging system includes a plurality of client computers 210. (For example, 210-1 and 210-2 are depicted.) In addition, the system includes an instant messaging server computer 230, and a network 208 which is configured to allow the various computers to communicate with each other. The network 208 may comprise, for example, a public computer network, such as the Internet.

Each client computer 210 may include an instant messaging (client) application 242. (For example, 242-1 and 242-2 are depicted in client computers 210-1 and 210-2, respectively.) The instant messaging server computer 230 may include an instant messaging server 244. The instant messaging application 242 and the instant messaging server 244 may comprise computer-readable program code which work cooperatively with each other for sending and receiving instant messages over the computer network 208.

More particularly, each instant messaging application 242 may create a communication connection with the instant messaging server 244. For example, the connection may be a transmission control protocol (TCP) connection. Instant message protocol packets (such as logon packets, status packets, buddy list packets, and message packets) may then be exchanged over the connection between the instant messaging application 242 and the instant messaging server 244.

One aspect of instant messaging (IM) is that messages are "pushed" to the IM applications 242. For example, a first user (logged onto a first IM application 242-1) may send an instant message to a second user (logged onto a second IM application 242-2) who is a "buddy" (i.e. member of a contact list) of the first user. That instant message is first sent from the first IM application 242-1 to the IM server 244, and then automatically delivered (pushed) from the IM server 244 to the second IM application 242-2.

Figure 3:
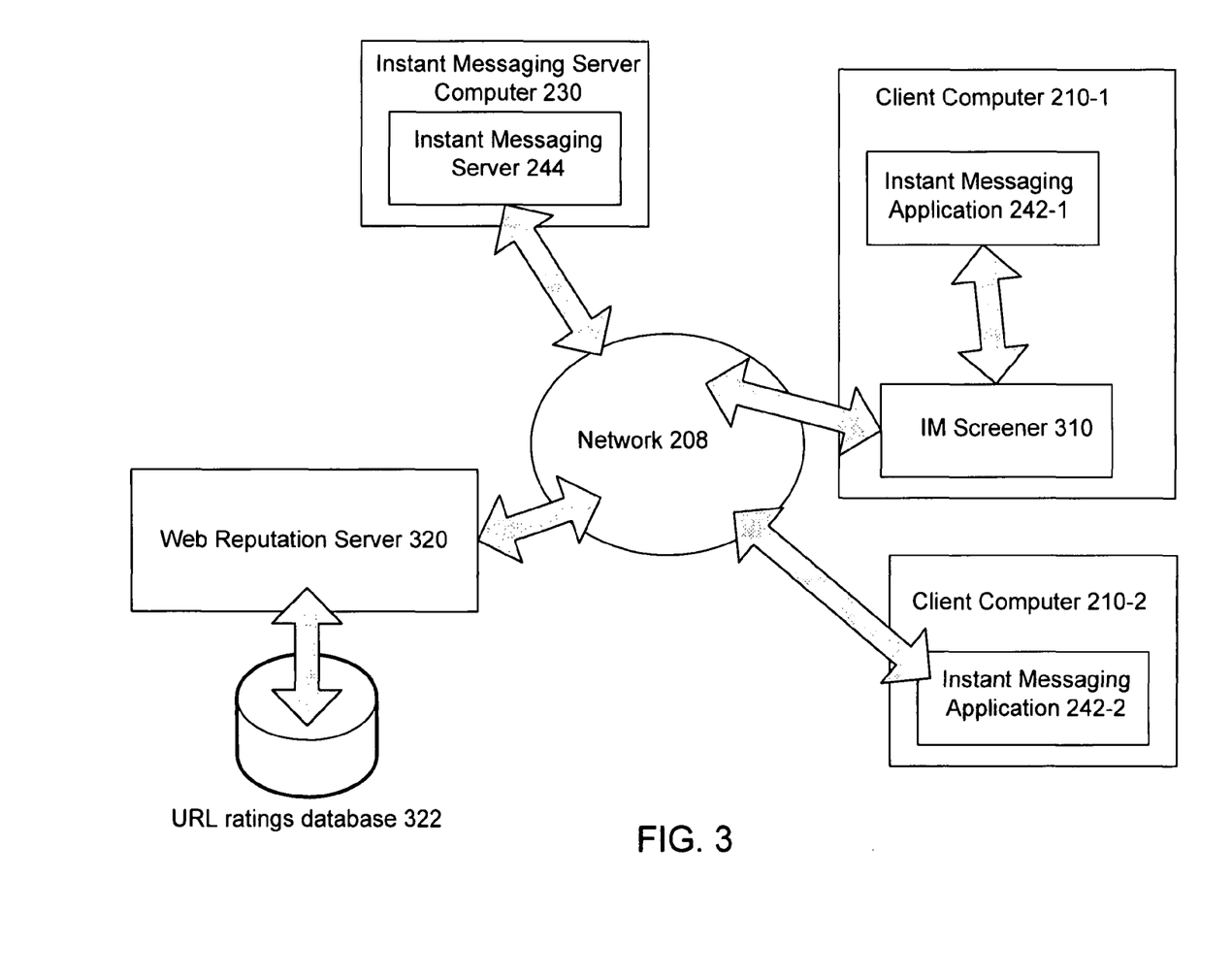
FIG. 3 schematically shows an apparatus configured to protect against instant message attacks and against the propagation of instant message attacks in accordance with an embodiment of the invention.

FIG. 3 schematically shows an apparatus configured to protect against instant message attacks and against the propagation of instant message attacks in accordance with an embodiment of the invention. In addition to the apparatus shown in FIG. 2, an internet messaging security application or IM screener 310 is shown as being included on a client computer 210-1. Furthermore, a web reputation server 320 is shown.

The IM screener 310 may be configured so as to be a part of an antivirus or Internet security utility or application. For example, the IM screener 310 may be configured to be a part of antivirus or Internet security software from Trend Micro Incorporated. As shown, the IM screener 310 may be configured so as to be effectively between the IM (client) application 242-1 and the communication network 208 so as to be able to screen or intercept instant messages being received or sent by the client computer 210-1.

The web reputation server 320 is coupled to the communication network 208. The web reputation server 320 may be configured with a URL ratings database 322 which includes ratings data for a multitude of URLs.

Figure 4:
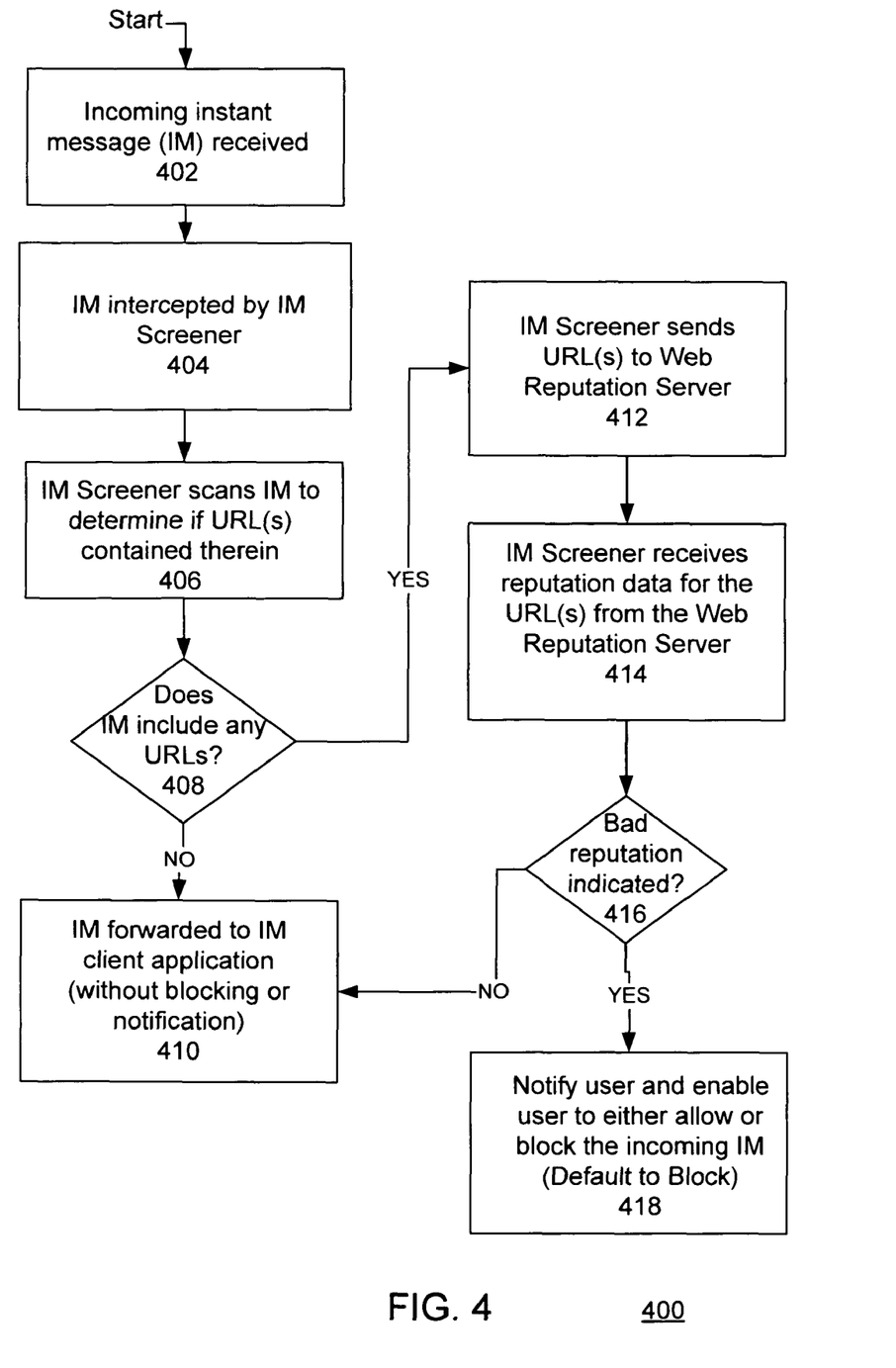
FIG. 4 is a flow chart depicting a method to protect against instant message attacks in accordance with an embodiment of the invention.

FIG. 4 is a flow chart depicting a method 400 to protect against instant message attacks in accordance with an embodiment of the invention. In a first step, an instant message is received 402 by a client computer 210 from an instant messaging server 244. Here, the client computer is configured with an IM screener 310 (in addition to an IM application 242).

The instant message is then intercepted 404 by the IM screener 310. In other words, the IM screener 310 screens incoming instant messages destined for the IM application 242. The IM screener 310 then scans 406 the intercepted instant message for any universal resource locators (URLs) contained therein. These URLs are typically hyperlinks to web sites on the Internet.

A determination 408 is then made as to whether any URLs were found in the instant message being screened. If no URL was found, then the IM screener 310 may forward 410 the instant message to the IM client application (without blocking or notification of a problem since no problem was indicated).

On the other hand, if the determination 408 finds one or more URLs in the instant message being screened, then the IM screener 310 sends 412 the URL(s) to the web reputation server 320 via the network 308. The web reputation server 320 receives the URL(s) and checks the URL(s) against the URL ratings database 322. The URL ratings database 322 classifies or rates a multitude of URLs depending on their reputation. For example, a URL may have a bad reputation due to it being known to be a "phishing" site or other malicious or suspicious site.

Reputation data for the URL(s) is returned from the URL ratings database 322 to the web reputation server 320. In one embodiment, a feature may be included where, if a URL is not in the URL ratings database 322 (i.e. the URL is unknown or unclassified), then the web reputation server 320 may download or access the unknown URL and check it for any malicious threats. The URL ratings database 322 may then be updated with the result of this active checking.

Based on the results obtained from the URL ratings database 322 (and any active checking performed), the web reputation server 320 returns reputation data for the URL(s) being screened to the IM screener 310. In other words, the IM screener 310 receives 414 the reputation data from the web reputation server 320. For example, the reputation data may indicate that a URL has a bad reputation due to its being known or identified as a phishing site or other illicit site, or the reputation data may indicate that a URL has a good reputation due to its being known or identified as a reputable business site or other reputable site, or the reputation data may indicate that a URL is of unknown reputation.

A determination 416 is then made as to whether a bad reputation is indicated by the returned reputation data. In other words, is any URL in the instant message classified as one having a bad reputation? If not, then the IM screener 310 may forward 410 the instant message to the IM client application (without blocking or notification of a problem).

Otherwise, if any URL in the instant message is classified as one having a bad reputation, then one or more responsive actions may be performed by the IM screener 310. For example, per block 418, a notification may be sent to the IM application 242 indicating the URL(s) with the bad reputation to the user. In addition, the user may be enabled by the software to either block or allow the incoming instant message to be displayed. The default setting may preferably be for the incoming instant message with bad reputation URL(s) to be blocked.

Figure 5:
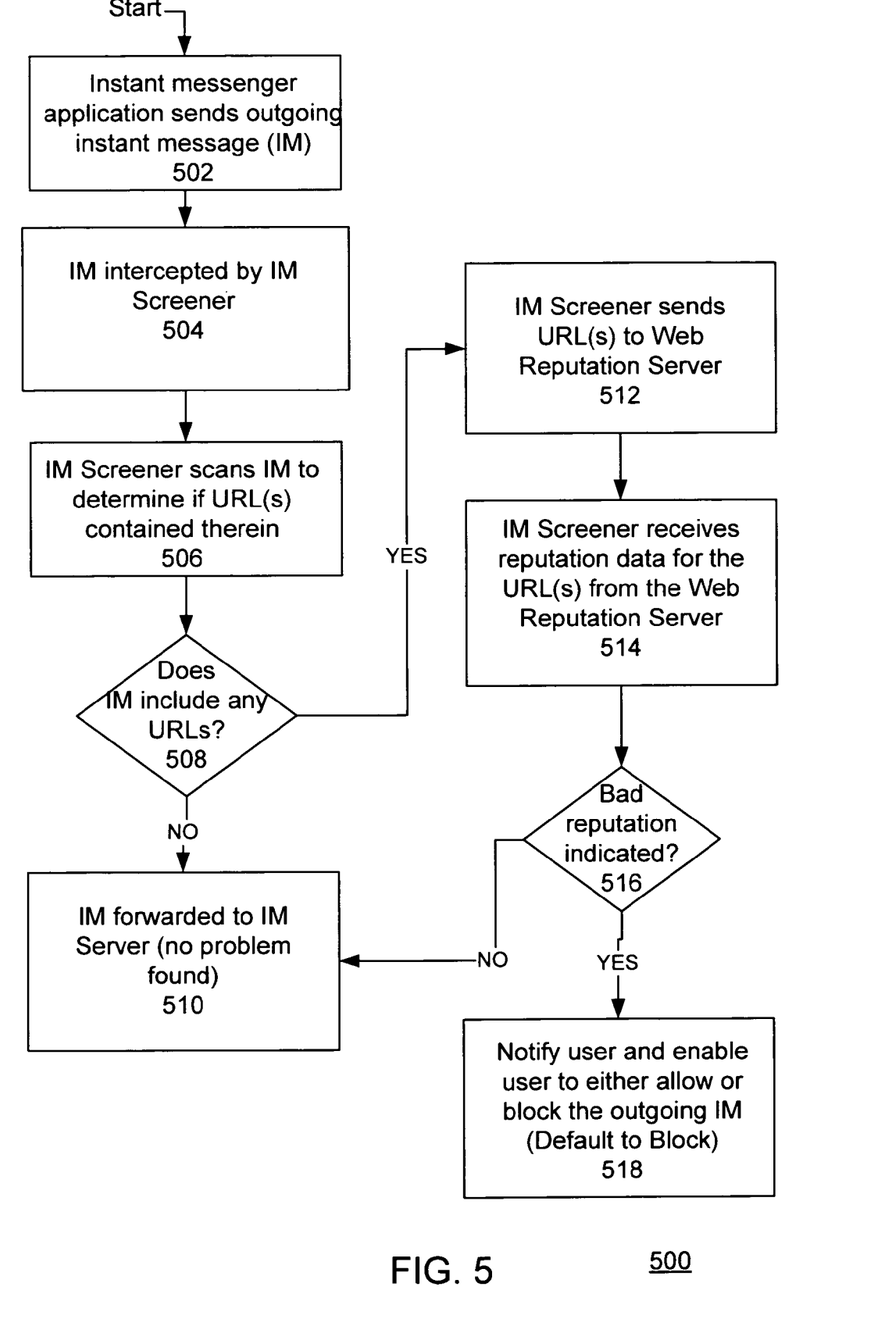
FIG. 5 is a flow chart depicting a method to protect against propagation of instant message attacks in accordance with an embodiment of the invention.

While the above-discussed method 400 shown in FIG. 4 protects a single client computer 210 against instant messenger based attacks, the following method 500 helps to prevent an infected system from spreading suspicious or illicit URLs via instant messaging. For example, an infected client computer 210 may have a virus or other malware which tries to send illicit URLs in outgoing instant messages to other instant message users named on a user's contact list.

FIG. 5 is a flow chart depicting a method 500 to protect against propagation of instant message attacks in accordance with an embodiment of the invention. In a first step, an instant message is sent 502 by an IM (client) application 242. Here, the client computer is configured with an IM screener 310 (in addition to the IM application 242).

The instant message is then intercepted 504 by the IM screener 310. In other words, the IM screener 310 screens outgoing instant messages originating from the local IM application 242. The IM screener 310 then scans 506 the intercepted instant message for any universal resource locators (URLs) contained therein. These URLs are typically hyperlinks to web sites on the Internet.

A determination 508 is then made as to whether any URLs were found in the instant message being screened. If no URL was found, then the IM screener 310 may forward 510 the instant message to the IM server 244 (as no problem was found).

On the other hand, the determination 508 finds one or more URLs in the instant message being screened, then the IM screener 310 sends 512 the URL(s) to the web reputation server 320 via the network 308. The web reputation server 320 receives the URL(s) and checks the URL(s) against the URL ratings database 322.

Based on the results obtained from the URL ratings database 322 (and any active checking performed), the web reputation server 320 returns reputation data for the URL(s) being screened to the IM screener 310. In other words, the IM screener 310 receives 514 the reputation data from the web reputation server 320. For example, the reputation data may indicate that a URL has a bad reputation due to its being known or identified as a phishing site or other illicit site, or the reputation data may indicate that a URL has a good reputation due to its being known or identified as a reputable business site or other reputable site, or the reputation data may indicate that a URL is of unknown reputation.

A determination 516 is then made as to whether a bad reputation is indicated by the returned reputation data. In other words, is any URL in the instant message classified as one having a bad reputation? If not, then the IM screener 310 may forward 510 the instant message to the IM server (as no problem is indicated).

Otherwise, if any URL in the instant message is classified as one having a bad reputation, then one or more responsive actions may be performed by the IM screener 310. For example, per block 518, a notification may be sent to the IM application 242 indicating to a user that an outgoing instant message containing URL(s) with a bad reputation is being sent by the IM application 242. In addition, the user may be enabled by the software to either block or allow the outgoing instant message to be sent out to the IM server 244. The default setting may preferably be for the outgoing instant message with bad reputation URL(s) to be blocked.

Figure 6:
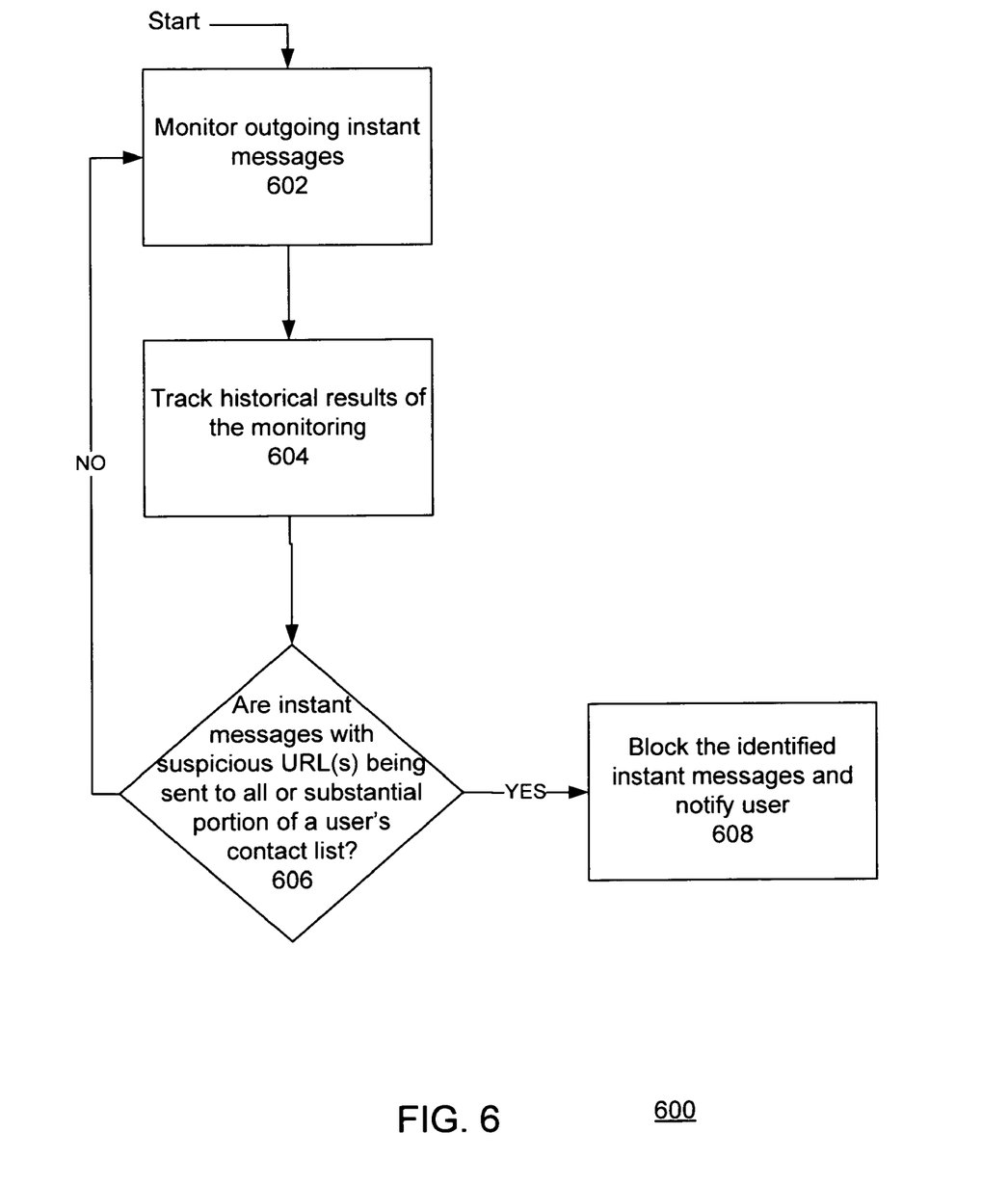
FIG. 6 is a flow chart depicting a method to protect against propagation of instant message attacks in accordance with another embodiment of the invention.

FIG. 6 is a flow chart depicting a method 600 to protect against propagation of instant message attacks in accordance with another embodiment of the invention. In a first step, outgoing instant messages are monitored 602 by the IM screener 310. Such monitoring may include intercepting the outgoing instant messages, parsing the instant messages to identify any universal resource locators (URLs) in the instant messages, and checking any URLs identified in the instant messages against a URL ratings database to generate reputation data.

Furthermore, the IM screener 310 tracks 604 historical results of the monitoring. For example, the outgoing instant messages found to have any suspicious (i.e. bad reputation) URL and the intended recipients of those messages may be stored as tracking data in a log.

The IM screener 310 may then use the tracking data to determine whether instant messages with any suspicious URL are being sent to all or a substantial portion of a user's contact list. If so, then the identified instant messages with the suspicious URL(s) may be blocked 608 and the user notified or warned that the user's computer is sending out instant messages with suspicious URL(s) to members of the user's contact list.

Advantageously, the above-discussed apparatus and methods provide effective protection for users against instant message attacks. Further, the above-discussed apparatus and methods protects against a client computer being unknowingly used to propagate an instant message attack.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method for protecting against propagation of instant messenger attacks from a client computer, the method comprising:

monitoring outgoing instant messages from said client computer by said client computer to identify any universal resource locators (URLs) therein which are associated with bad reputation web sites;

tracking historical results of said monitoring by said client computer, and determining whether said outgoing instant messages are being sent to all members, or a substantial portion of the members, of a contact list for a user account by said client computer.

2. The method of claim 1, wherein said monitoring involves sending an identified URL to a web reputation server and receiving reputation data for said identified URL from said web reputation server.

3. The method of claim 1, further comprising automatically blocking said outgoing instant messages if said outgoing instant messages are being sent to all members, or a substantial portion of said members, of said contact list.

4. A computer-readable storage medium having stored thereon computer-executable instructions and data that, when loaded and executed by a processor of a client computer causes said client computer to protect against propagation of instant messenger attacks from said client computer by executing an instant messaging screener on said client computer to monitor outgoing instant messages from said client computer to identify any universal resource locators (URLs) therein which are associated with bad reputation web sites, track historical results of said monitoring by said client computer, and determine whether said outgoing instant messages are being sent to all members, or a substantial portion of said members, of a contact list for a user account by said client computer.

5. A client computer configured to protect against propagation of instant messenger attacks from said client computer, said client computer comprising:
- a processor configured to execute computer executable instructions;
- memory configured to store said computer executable instructions and other data;
- an input/output interface for communicating data to devices outside said client computer;
- a system which communicatively interconnects the processor, said memory and said input/output interface;
- an instant messaging application at said client computer, said instant messaging application comprising computer executable instructions for receiving and sending instant messages;
- an instant messaging screener executing at said client computer, said instant messaging screener comprising computer executable instructions configured to (a) monitor outgoing instant messages from said client computer to identify any universal resource locators (URLs) therein which are associated with bad reputation web sites, (b) track historical results of said monitoring at said client computer, and (c) determine whether said outgoing instant messages are being sent to all members, or a substantial portion of said members, of a contact list for a user account at said client computer.

6. The client computer of claim 5, wherein said monitoring involves sending an identified URL to a web reputation server and receiving reputation data for said identified URL from said web reputation server.

7. The client computer of claim 5, further comprising automatically blocking said outgoing instant messages if said outgoing instant messages are being sent to all members, or a substantial portion of said members, of said contact list.

* * * * *